Sept. 13, 1932.  G. W. FERGUSON  1,876,888
DEVICE FOR WATERING PLANTS
Filed March 23, 1931
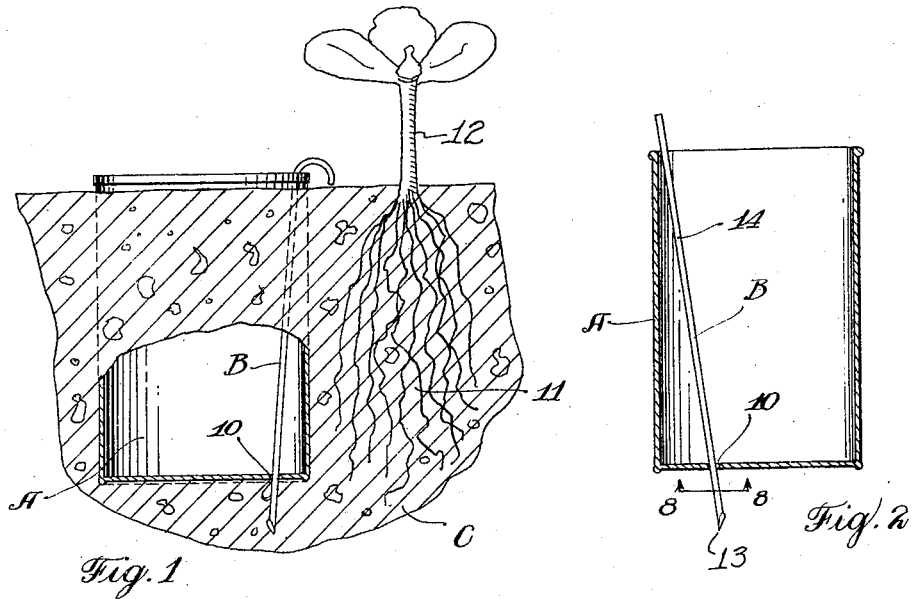
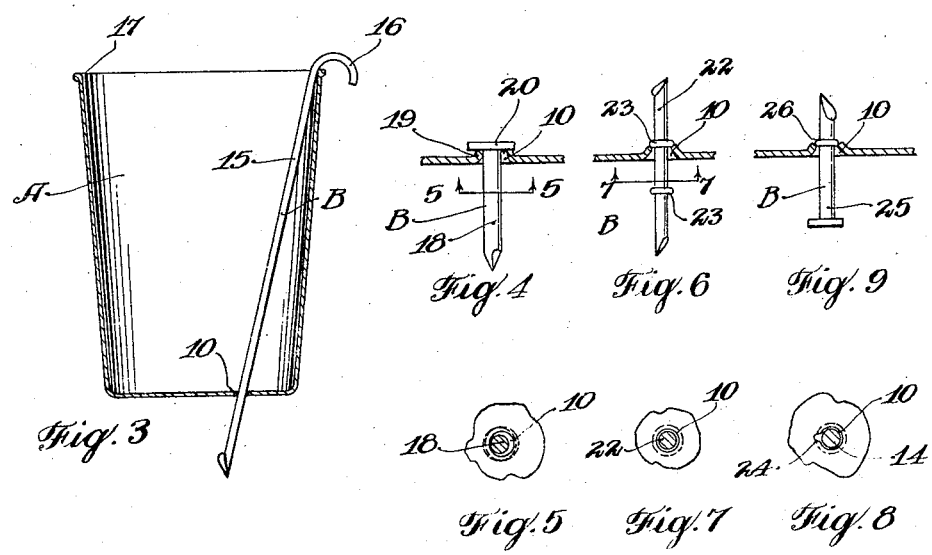
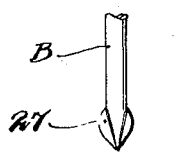
Inventor
George W. Ferguson
By Howard Pinche
Attorney Patented Sept. 13, 1932

1,876,888

UNITED STATES PATENT OFFICE

GEORGE W. FERGUSON, OF MINNEAPOLIS, MINNESOTA

DEVICE FOR WATERING PLANTS

Application filed March 23, 1931. Serial No. 524,432.

My invention relates to an improvement in a device for watering plants, wherein it is desired to provide a simple and inexpensive means of providing moisture to the earth about the roots of plants and the like.

It is the common practice of persons watering growing plants to sprinkle the surface of the ground with water, wetting the earth sufficiently to allow some of the moisture to soak into the ground the depth of the roots, through which plants commonly draw sufficient water to sustain the plant. This practice has some very undesirable features. When the surface of the ground is moistened, the heat of the sun often dries and cracks the surface, baking the same to a hard crust, and often impeding the growth of the plant. Likewise, wetting a layer of earth at the surface has a tendency to prevent the deep rooting of the plant, as the roots ordinarily grow in the direction of moisture.

It is the object of my invention to provide a means of watering the ground at a distance from the surface thereof, moistening a layer of earth somewhat below the top of the ground. This has a tendency to cause the roots of plants in the vicinity of this moistened earth to grow downwardly toward the moistened area, causing the desirable deep rooting of the plants. This structure also avoids the usual baking or hardening of the top surface of the earth, and the plants may receive the necessary moisture without having a large part of the benefits of watering counteracted by the undesirable effects of sprinkling the top surface of the ground.

It is the object of my invention to provide a container for water which is adapted to be set down into the ground so that the bottom of the container is spaced somewhat from the surface of the earth. A hole is formed at or near the bottom of this container and it is my purpose to insert in this hole some sort of an obstruction which fills up a large proportion of the area of the hole. The obstruction fits in the hole loosely enough to permit water to seep from the filled container a drop at a time. This extremely slow seepage of water permits the escaped moisture sufficient time to be absorbed by the surrounding earth, and the size of the moistened area depends upon the speed at which the water is drained from the container.

Many designs of obstructions may be provided, a number of which are illustrated in the drawing and will be hereinafter described, but the principle in each case is virtually the same. In each modification the container is provided with a hole at the bottom thereof, and in each case an obstruction is placed in the hole of sufficient size to obstruct a large proportion of the area of the hole and yet fitting therein with sufficient looseness to allow water to seep out a drop at a time.

These and other novel features and objects of my invention will be more clearly and fully set forth in the following specification and claims.

In the drawing forming a part of this specification:

Figure 1 is a diagrammatic view, partly in section, of a watering device made in accordance with the principles of my invention, as it would appear in position in the ground.

Figure 2 is a cross sectional view of the container in readiness to be used.

Figure 3 illustrates a slightly different type of container and obstruction.

Figure 4 illustrates a detail view of a modification of obstruction to be placed in the hole.

Figure 5 is a section of the line 5—5 of Figure 4.

Figure 6 is another type of obstruction.

Figure 7 is a cross sectional view on the line 7—7 of Figure 6.

Figure 8 is a cross sectional view on the line 8—8 of Figure 2.

Figure 9 is a detail view of a slightly different form of obstruction.

Figure 10 is a detail view of a point formation of obstruction.

My device for watering plants consists of a container A, a hole 10 formed in the bottom of this container, and an obstruction B partially filling the hole 10 to prevent the water from draining from the container A too rapidly and to cause slow seepage into the surrounding earth.

Figure 1 illustrates the container A set into the earth. The obstruction B is projecting through the hole 10 down into the earth, and a drop of water may be seen seeping through the hole 10 about the obstruction B. This water is absorbed by the earth C in an area adjacent the bottom of the container A, and causes the roots 11 of the plant 12 to grow downwardly toward this moist area. Deep rooting of the plant 12 thus takes place, and the plant is stronger and hardier than would otherwise be possible with ordinary means of watering.

The container A may be in the form of a metal can, or may be a prepared paper or composition cup. Figure 3 of the drawing illustrates a waxed paper cup, capable of withstanding heat and cold, used as a container. An ordinary sized cup of this type may be made to drain so gradually that after being filled will last a period of several hours without refilling. Thus, if the container A were filled two or three times a day, the roots of plants growing in the vicinity of the container will be continuously watered, and sufficient moisture will be afforded the roots to keep them constantly in the best possible condition, without the necessity of using excess water or sprinkling the plants continuously.

In order that the device operate properly, it is necessary to exercise care in preparing the container A and the obstruction B. Figure 2 of the drawing illustrates an obstruction in the form of a rod, pointed at one end, passing through the bottom of the container A. To insure a sufficiently large hole to permit the seepage of water, the end 13 of the rod 14 is flattened in a manner to project slightly beyond the diameter of the rod 14. When the rod 14 is forced through the bottom of the can, this flattened projecting portion cuts a notch to one side of the hole, so that when the rod 14 is in the position illustrated in Figure 2, water may seep through the bottom of the container A through this notch, the rod 14 assisting the seepage by presenting a surface down which the water may run.

Figure 3 illustrates a somewhat similar type of obstruction B, this rod 15 forming a hook 16 at the extreme upper end thereof which may loop over the edge or rim of the container A, to hold the rod in place.

Figure 4 illustrates a modification in which an obstruction B in the form of a headed rod 18 is used. In the use of this type of obstruction, the hole 10 must be formed by driving the pointed end of the rod 18 into the container from the bottom thereof, leaving a ragged and irregular edge 19 about the edge of the hole, and extending upwardly into the container. The rod 18 is then inserted in the hole in the manner illustrated in Figure 4. The head 20 rests upon the ragged edge of the hole 10 and allows water to seep out through the irregularities, a drop at a time.

As may be seen in the sectional view of Figure 5, the hole is slightly larger than the rod 18.

Figure 6 illustrates a rod 22 which is furnished with enlargements of the diameter at the points 23. It is apparent that when this rod 22 is driven through the container, the enlarged portions 23 will form a hole somewhat larger than the diameter of the rod 22. The spring of the material forming the container A is sufficient to prevent the rod 22 from being readily removed from the hole 10 when inserted into the position illustrated in Figure 6. This type of rod is obviously reversible. As may be seen in Figure 7, there is a space between the rod 22 and the edge of the hole 10 to permit water to seep therethrough.

The cross sectional view illustrated in Figure 8 shows the form of hole produced by a rod pointed in the manner of the end 13 of the rod 14. This notch 24 permits the seepage of water in the manner described.

The modification of obstruction illustrated in Figure 9 of the drawing, is somewhat similar to that illustrated in Figure 4 of the drawing. In this modification, however, the headed rod 25 is equipped with an extension of the diameter 26, so that when the rod 25 is driven through the container A the spring of the material forming the container will prevent the rod 25 from being withdrawn from the hole 10 readily.

The means of extending the diameter may be any convenient means such as roughening the outer surface of the rod, upsetting the rod to form a ridge or ring of larger diameter than the rod, or flattening the rod to elongate the diameter. Various forms of points may be used on the rods when desired, one form being illustrated in Figure 10 of the drawing. The point 27 referred to in this form is slightly flattened to cause the width of a portion of the point to extend to both sides beyond the diameter of the rod. A point of this type would form a hole having a notch on diametrically opposite sides thereof.

It is apparent that many various forms could be illustrated which would be similar or equivalent. Each, however, could be used to the same advantage. The idea in each of the cases would be similar, as each modification illustrates a container A, and an obstruction B which acts to prolong the period of drainage of water from the container, and causes a positive, steady seepage of water to the surrounding earth.

In accordance with the patent satutes, I have described the principles of operation of my device for watering plants, and while I have endeavored to set forth the best embodiments thereof, I desire to have it understood that this is only illustrative of a means of carrying out my invention, and that obvious changes may be made within the scope of the following claims without departing from the spirit of the invention.

I claim:

1. A device for watering plants and the like including, a container for water adapted to be set down into the ground, a hole formed in said container, and an obstruction fitting loosely in said hole limiting the drainage from said container to a drop at a time.

2. A plant watering device including, a container for water adapted to be set into the ground, an irregularly shaped hole in said container, and an obstruction in said hole allowing moisture to seep through the irregularities of said hole.

3. A plant watering device including, a container for water adapted to be set into the ground adjacent the plant, an irregular hole at the bottom thereof, and an obstruction in said hole allowing seepage through said irregularities and enlarged diameter portions on said obstruction.

4. A plant watering device including, a container for water adapted to be set into the ground adjacent a plant, a hole in said container, an obstruction in said hole, and portions of enlarged diameter upon said obstruction to prevent easy removal of said obstruction from said hole.

5. A plant watering device including, a container adapted to be set into the ground, a hole in the bottom of said container, a rod extending through said hole, and an enlargement on said rod adapted to prevent said rod from slipping through said hole.

6. A device for watering plants including, a container adapted to be set into the ground, a rod, an enlargement on said rod, said rod being adapted to be forced through the bottom of said container, said enlargement forming a hole in said container of greater diameter than said rod.

GEORGE W. FERGUSON.